United States Patent Office 3,222,325
Patented Dec. 7, 1965

3,222,325
SULFUR-CURABLE ELASTOMERIC POLYMERS
OF EPITHIOHYDROCARBONS
Nicolas Brodoway, Claymont, Del., assignor to E. I. du
Pont de Nemours and Company, Wilmington, Del., a
corporation of Delaware
No Drawing. Filed Jan. 29, 1962, Ser. No. 170,534
2 Claims. (Cl. 260—79.7)

This invention is directed to unsaturated epithiohydrocarbons and to elastomeric polymers prepared therefrom.

While a great many useful polymeric materials are known, the search continues for new polymeric materials to meet the widely diverse needs of an advancing technology.

It is, therefore, an object of this invention to provide a novel class of compounds. It is a further object to provide polymers prepared from said compounds, which polymers are elastomeric materials having significant and useful properties. These and other objects will become apparent in the following description and claims.

More specifically, the present invention is directed to compounds of the formula

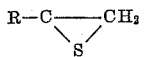

wherein R is selected from the group consisting of cyclic and acyclic hydrocarbon radicals containing from 3 to 8 carbon atoms, said radicals containing one aliphatic

group.

This invention is also directed to polymers consisting of a multiplicity of units of the structure

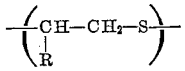

in which structure R is as heretofore described.

The hydrocarbon group designated as R may be a branched or nonbranched acyclic radical; it may be a cycloalkenyl radical, or may contain both cyclic and acyclic structures. Examples of compounds are: 4,5-epithio-1-pentene, 5,6-epithio-1-hexene, 5,6-epithio-2-hexene, 5,6-epithio-2-methyl-1-hexene, 1,2-epithio-1-(3-cyclohexen-1-yl)ethane, 9,10-epithio-1-decene, 7,8-eptihio - 1- octene, 7,8-epithio-2-methyl-1-octene, and 1,2-epthio-1-(2-cyclopenten-1-yl) ethane.

The preferred compounds are those in which the R radical contains 3 to 6 carbon atoms.

The novel compounds of this invention may be prepared from the corresponding epoxy compounds by reacting them with thiourea as described in J. Am. Chem. Soc., 75, 4959 (1953). The corresponding epoxy compounds may be prepared in known ways. For example, they may be prepared by the monoepoxidation of the corresponding compounds containing two carbon-to-carbon double bonds as described in J. Chem. Soc., 1950, 3131–5, and Chemical Reviews, 45, 16 (1949).

The reaction is carried out in a solvent such as water or ethanol which is capable of dissolving the thiourea and the epoxy compound to at least a slight extent. It is preferred to carry out the reaction in acid medium to prevent undesirable side reactions. Temperature should be kept below about 30° C. to avoid polymerization of the epithio compound as it is formed. The temperature, of course, should be above the freezing point of the reaction medium. Preferred temperatures are between about 10° and 25° C. in order to have the reaction proceed at a satisfactory rate. Ordinary atmospheric pressures are used, although higher or lower pressures may be used if desired. The product is isolated by conventional techniques, as by vacuum distillation. Reduced pressures should be used during fractionation to avoid polymerization of the product. Pressures of 2 to 20 mm. Hg are usually satisfactory.

The novel compounds prepared according to the present invention may be converted to polymeric thioethers which are useful elastomeric materials. Polymerization is carried out in an inert organic solvent in the presence of a catalyst of the anionic type. Suitable catalysts include alkali metals; strongly basic salts of alkali metals, such as hydroxides, sulfides, hydrosulfides, mercaptides, alkoxides, and amides; metal alkyls, particularly of divalent and trivalent metals. Examples of suitable catalysts are sodium, lithium, sodium hydroxide, sodium sulfide, triisobutylaluminum, diethylzinc, phenylmagnesium bromide, diethylmagnesium, and sodium, zinc, or aluminum salts of dodecyl mercaptan. Suitable solvents are aromatic hydrocarbons—such as benzene, toluene, and xylene—tetrachloroethylene, and thiophene. The solvent should be anhydrous.

The polymerization is carried out at a temperature ranging from about 0 to 75° C. At temperatures below 0° C. the polymerization proceeds too slowly to be practical. Since the molecular weight of the polymer is adversely affected by elevated temperatures, it is preferred to carry out the polymerization at as low a temperature as is feasible. The preferred temperature range is about 25° to 60° C.

It is generally more convenient to carry out the polymerization at atmospheric pressure, although higher or lower pressures may be used.

The reaction should be carried out in an inert atmosphere, such as in an atmosphere of nitrogen.

The polymers are isolated by conventional methods. For example, the polymerization mass may be dissolved in an organic solvent, such as toluene, benzene, xylene, tetrachloroethylene, tetrahydrofuran, or chloroform and the polymer is precipitated by adding an alcohol such as ethanol or isopropyl alcohol. The solvents are then removed in vacuo.

The novel polymers produced according to the present invention are elastomeric in character. Because of the pendant groups containing a double bond, they may be cured readily with sulfur and typical vulcanization accelerators using techniques applicable to other unsaturated elastomers. Depending on the state of cure obtained, their properties may be varied from those of an elastomer to those of a brittle resin.

They may also be used for such applications as in caulking compounds and as binders for paint formulations.

The novel monomeric compounds of this invention may also be copolymerized with other epithio compounds to produce polymeric thioethers containing pendant unsaturated groups in varying proportions. For example, the copolymeric polythioether prepared by copolymerizing 0.57 mole of propylene sulfide and 0.03 mole of 5,6-epithio-1-hexene is an elastomer which may be cured with a conventional sulfur recipe to a vulcanizate showing outstanding resistance to attack by acetone and other solvents.

Representative examples illustrating the present invention follow.

*Example A.—Preparation of 5,6-epoxy-1-hexene*

A mixture of 500 grams of 1,5-hexadiene and 1000 ml. of methylene chloride is stirred an maintained at 15–20° C. by external cooling. A mixture of 1190 grams of 40% peracetic acid in glacial acetic acid and 92 grams of sodium acetate trihydrate is added over a five-hour period to the 1,5-hexadiene solution. External cooling and stirring are continued until the reaction is no longer exothermic. The total reaction time is about nine hours.

The reaction mixture is mixed with four liters of water and the organic phase is separated. After washing the organic phase with 10% sodium carbonate solution and water, it is dried over calcium chloride, filtered and fractionated through a spinning band column. The monoepoxide is collected at 53–58° C./80 mm. Hg in 45% yield.

*Example 1*

A slurry is prepared consisting of 76 grams (one mole) of thiourea and 49 grams (one equivalent) of sulfuric acid in 300 ml. of water. The slurry is agitated and held at 20–25° C. while 98 grams (one mole) of 5,6-epoxy-1-hexene is added dropwise. The mixture is stirred for five hours, is allowed to stand overnight at room temperature, and is then neutralized by dropwise addition of a 20 percent aqueous solution of sodium carbonate. The 5,6-epithio-1-hexene is distilled as an azeotrope with water under reduced pressure. A 75 percent yield of 5,6-epithio-1-hexene is obtained at 42–43.5° C. (10 mm. of Hg) by fractionation of the crude organic product.

*Example 2*

A mixture of 22.8 g. (0.2 mole) of 5,6-epithio-1-hexene and 0.02 ml. of diethylzinc solution (25% by weight in heptane) is stirred under dry nitrogen in a flame-dried flask. Additional 0.02 ml. portions of the diethylzinc solution are added if needed to give a noticeable viscosity increase in half an hour. Once the polymerization is initiated, the solution is allowed to stand at room temperature for four days. The solid mass is extracted with ethanol (Formula 2B) and the volatile components are removed at 90° C./1 mm. Hg. The residue is a tacky elastomeric polymer having an inherent viscosity of 1.6 (determined as a solution of 0.1 gram of polymer in 100 ml. of toluene at 30° C.).

The polymer is compounded on a rubber mill with the same recipe as in Example 4 which follows:

The denatured alcohol (Formula 2B) is defined in the 1961 Lange Handbook of Chemistry, Tenth Edition, p. 1781.

*Example 3*

A mixture of 5.7 g. (0.05 mole) of 5,6-epithio-1-hexene and 0.05 ml. of a 25% solution of diethylzinc in heptane is stirred in a flame-dried flask under a dry nitrogen atmosphere for three hours at room temperature. The slightly viscous solution is allowed to stand under nitrogen at room temperature for five days. The solid mass is dissolved in toluene and the polymer is precipitated from solution by addition of ethanol (Formula 2B). The solvents are removed by heating the polymer at 65 C./1 mm. Hg for five hours. The soft tacky elastomer weighs 5.3 g. (93% conversion of monomer). The inherent viscosity is 3.2 (0.1 gram in 100 ml. of toluene at 30° C.).

*Example 4*

A mixture of 42.2 grams (0.57 mole) of propylene sulfide, 3.42 grams (0.03 mole) of 5,6-epithio-1-hexene, and 0.1 ml. of a 25% aqueous solution of diethylzinc in heptane is put into a dry flask under a nitrogen atmosphere and is stirred for three hours at room temperature. After this time the viscosity of the solution is very high. The solution is allowed to stand for five days at room temperature. The solid reaction mass is then dissolved in toluene, the polymer is precipitated by adding denatured alcohol (Formula 2B), and the volatile components are removed in vacuo. The polymer weighs 41.4 grams, representing a 91% conversion of monomers. The inherent viscosity of the polymer (0.1 gram in 100 ml. of toluene at 30° C.) is 1.68.

The copolymer is compounded on a rubber mill using the following recipe:

|  | Parts by weight |
|---|---|
| Copolymer | 100 |
| N-phenyl-2-naphthylamine | 2 |
| Semireinforcing furnace black | 50 |
| Zinc oxide | 5 |
| Sulfur | 2 |
| 2-mercaptobenzothiazole | 1 |
| Tetramethylthiuram disulfide | 1.5 |

The compounded material is cured in a mold in a press for one hour at 153° C. The tensile properties of the cured elastomer, determined by ASTM Method D–412–51 T are:

| | |
|---|---|
| Modulus at 200% elongation, p.s.i | 840 |
| Tensile strength at the break, p.s.i | 1000 |
| Elongation at the break, percent | 260 |

The preceding representative examples may be varied within the scope of the present total specification disclosure, as understood and practiced, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A sulfur-curable, elastomeric polymer consisting of a multiplicity of units of the structure

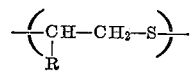

in which structure R is selected from the group consisting of cyclic and acylic hydrocarbon radicals containing from 3 to 8 carbon atoms, said radicals containing one aliphatic carbon-to-carbon double bond.

2. A polymer according to claim 1 wherein R is a 3-butenyl-radical.

References Cited by the Examiner
UNITED STATES PATENTS

| 2,183,860 | 12/1939 | Coltof | 260—79 |
| 2,185,660 | 1/1940 | Coltof et al. | 260—79 |

JOSEPH L. SCHOFER, *Primary Examiner.*

JOSEPH R. LIBERMAN, *Examiner.*

UNITED STATES PATENT OFFICE
CERTIFICATE OF CORRECTION

Patent No. 3,222,325                                December 7, 1965

Nicolas Brodoway

It is hereby certified that error appears in the above numbered patent requiring correction and that the said Letters Patent should read as corrected below.

Column 1, lines 24 to 26, the formula should appear as shown below instead of as in the patent:

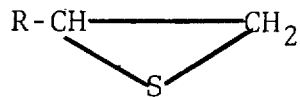

line 45, for "-eptihio-" read -- -epithio- --; same column 1, line 46, for "-epthio-" read -- -epithio- --; column 2, line 66, for "an" read -- and --; column 3, line 51, for "65 C./1 mm." read -- 65° C./1 mm. --.

Signed and sealed this 25th day of October 1966.

(SEAL)
Attest:

ERNEST W. SWIDER                                  EDWARD J. BRENNER
Attesting Officer                                  Commissioner of Patents